United States Patent [19]

Kluger et al.

[11] Patent Number: 4,912,203

[45] Date of Patent: * Mar. 27, 1990

[54] THIOPHENE BASE COLORANTS USEFUL FOR COLORING THERMOSET RESINS

[75] Inventors: Edward W. Kluger, Pauline; Patrick D. Moore, Spartanburg, both of S.C.

[73] Assignee: Milliken Research Corporation, Spartanburg, S.C.

[ * ] Notice: The portion of the term of this patent subsequent to Jul. 22, 2003 has been disclaimed.

[21] Appl. No.: 194,761

[22] Filed: May 17, 1988

Related U.S. Application Data

[63] Continuation of Ser. No. 58,696, Jun. 1, 1987, Pat. No. 4,775,748, which is a continuation of Ser. No. 624,379, Jun. 25, 1984, abandoned.

[51] Int. Cl.$^4$ .................. C09B 29/01; C09B 29/033; C09B 29/09; D06P 3/24
[52] U.S. Cl. ..................... 534/729; 534/735; 534/753; 534/787; 534/788; 534/794
[58] Field of Search .................. 534/753, 573 L, 735, 534/729

[56] References Cited

U.S. PATENT DOCUMENTS

| | | | |
|---|---|---|---|
| 2,827,450 | 3/1958 | Towne et al. | 260/152 |
| 3,994,483 | 11/1976 | Wolf et al. | 260/2.5 |
| 4,113,372 | 9/1978 | Hauser et al. | 260/178 |
| 4,132,284 | 1/1979 | Hugl et al. | 521/167 |
| 4,264,495 | 4/1981 | Maher et al. | 260/152 |
| 4,284,729 | 8/1981 | Cross et al. | 521/158 |
| 4,601,725 | 7/1986 | Keller et al. | 8/403 |
| 4,775,748 | 10/1988 | Kluger et al. | 534/729 |

FOREIGN PATENT DOCUMENTS

| | | | |
|---|---|---|---|
| 2334169 | 1/1974 | Fed. Rep. of Germany | 537/753 X |
| 58-101155 | 6/1983 | Japan | 534/753 X |
| 1394365 | 5/1975 | United Kingdom | 534/753 X |
| 1429484 | 3/1976 | United Kingdom | 534/753 X |
| 1583377 | 1/1981 | United Kingdom | 534/753 X |

Primary Examiner—Floyd D. Higel
Attorney, Agent, or Firm—Terry T. Moyer; H. William Petry

[57] ABSTRACT

Thiophene based colorants useful for coloring thermoset resins such as polyurethanes being the formula:

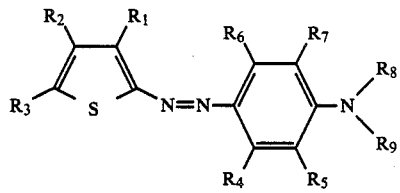

wherein $R_1$, $R_2$ and $R_3$ are selected from halogen, carboxylic acid, alkanoyl, aryloyl, carbocyclic forming polymethylene chains, alkyl, aryl, cyano, thioalkyl, dithioalkyl, thioaryl, dithioaryl, thiocyano, carboxyalkyl, carboxyaryl, amidoalkyl, amidodialkyl, amidoaryl, amidodiaryl, oxyalkyl, thioamidoalkyl, thioamidodialkyl, or hydrogen when an adjacent group is isobutyryl; $R_4$, $R_5$, and $R_7$ are selected from hydrogen alkyl, oxyalkyl, sulfonamidoalkyl, sulfonamidoaryl, amidoalkyl, amidodialkyl, amidoaryl, amidodiaryl, halogen, thioalkyl and thioaryl; and $R_8$ and $R_9$ are selected from polyalkylene oxide, copolymers of polyalkylene oxides, and hydroxyalkylenes.

4 Claims, No Drawings

THIOPHENE BASE COLORANTS USEFUL FOR COLORING THERMOSET RESINS

This is a continuation application of co-pending Ser. No. 058,696, filed June 1, 1987, now U.S. Pat. No. 4,775,768 which is in turn a continuation of U.S. Ser. No. 624,379, filed June 25, 1984, now abandoned.

This invention relates to novel reactive colorants based on thiophene derivatives which have particular application in coloration of thermoset resins, exemplified by polyurethanes.

It is known that polyurethane resins, produced by the reaction of polyol and an isocyanate may be colored by adding a pigment or dyestuff to the resin. When, however, certain thermoset materials such as polyurethanes are colored with a pigment, the resulting product may be only slightly tinted at normal pigment concentrations, and may thus require larger, undesirable amounts of pigment if a dark hue is to be attained. This phenomenon is particularly apparent in the case of polyurethane foams. On the other hand, if a conventional dyestuff is employed to color the thermoset product, water resistance, oil resistance, and/or resistance to migration of the dyestuff may often be disadvantageously inadequate. When such a dye is used as a coloring agent, it is difficult to prevent bleeding of the dye from the colored resin product. Thermosetting resin products, such as polyurethanes, however, which have been colored with a dyestuff, have certain advantages. Particularly, such colored products may, for instance, possess a clearer hue, and improved transparency characteristics, both of which are important commercial attributes.

Dyes rather than pigments are preferred for use in coloring polyurethane resins because each molecule of a dye imparts color to the product. Conversely, only the surface molecules of pigment particles impart color. From the standpoint of utilization, then, dyes are more effective than pigments. Due to the above noted shortcomings of dyes, however, pigments have historically been used extensively.

One definite improvement in prior art techniques is set forth in commonly assigned U.S. Patent 4,284,729 to Cross et al in which a liquid polymeric colorant is added to the reaction mixture during production of a thermoset resin. Cross et al determined that a liquid, reactive, polymeric colorant could be added before or during the polyaddition reaction to achieve desired coloration of the thermoset resin. The specific polymeric colorant of Cross et al has the formula:

R (polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; X is selected from —OH, —NH$_2$ and —SH, and n is an integer of from about 1 to about 6. The liquid coloring agent is added to the reaction mixture in an amount sufficient to provide the intended degree of coloration of the thermoset resin.

Even though the Cross et al polymeric colorant represents vast improvement over prior art techniques, certain problems remain with regard to coloration of polyurethane resins, and foams, in particular. During the complex reactions experienced in producing thermosetting resins, such as polyurethane foams, interactions may occur between certain substituents of the colorant and reactive components of the reaction mixture. In polyurethane foam production specifically, a careful balance must be maintained throughout the reaction to achieve the desired end product. If the proper balance is not maintained, a product may be produced that is outside the desired product specifications and/or the final product may exhibit poor stability under certain conditions.

Other approaches to coloration of polyurethanes specifically are set forth in U.S. Pat. Nos. 3,994,835 to Wolf et al and 4,132,840 to Hugl et al. Wolf et al discloses the addition of dispersions of dyestuffs containing at least one free amino or hydroxyl group capable of reacting with the isocyanate under the conditions of polyaddition and liquids in which the dyes are soluble to an extent less than 2 percent. Hugl et al disclose the coloration of polyurethane resins with dyestuffs having the formula

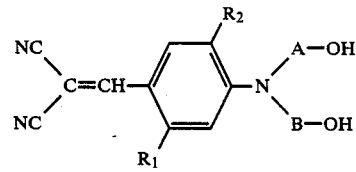

wherein R$_1$ is hydrogen, halogen, optionally substituted C$_1$–C$_4$ alkyl, optionally substituted C$_1$–C$_4$ alkoxy and optionally substituted C$_1$–C$_4$ alkylcarbonylamino and R$_2$ denotes hydrogen, optionally substituted C$_1$–C$_4$ alkyl and optionally substituted C$_1$–C$_4$ alkoxy, while A and B denote optionally branched alkylene chains which can be identical or different and preferably have 2 to 6 carbon atoms.

Also as noted in "New Uses For Highly Miscible Liquid Polymeric Colorants In The Manufacture of Colored Urethane Systems", a paper presented by P. D. Moore, J. W. Miley and S. Bates at the 27th Annual Technical/Marketing Conference for SPI, many extra advantages are attendant to the use of polymeric colorants in polyurethanes beyond the mere aesthetic coloration of same. Specifically, such polymeric colorants can act as important process control indicators which enable one to more closely maintain quality control parameters by visual observation of product color. While the polymeric colorants of Moore et al are of the type referred to in the aforementioned Cross et al patent, like advantages may also be realized from reactive colorants according to the present invention. In fact, certain of the Cross et al colorants encounter adverse interactions in the production of polyurethane foam which are not encountered by the novel colorants of the present invention. Particularly, it has been determined that while all of the Cross et al polymeric colorants may be successfully employed in the coloration of thermoset resins generally, certain of the colorants fail in the production of polyurethane foams where tin catalysts and flame retardant chemicals are present.

Certain known prior art discloses dyestuffs that are somewhat related to certain of the colorants of the present invention, e.g. U.S. Pat. Nos. 2,827,450; 4,301,068; 4,113,721; 4,282,144; 4,301,069; 4,255,326; British Patents 1,583,377; and 1,394,365; and German Offenlegungscrift 2,334,169. Likewise the above prior art discloses techniques for coloration of polyurethane resins. None of the known prior art, however, teaches or suggests the use of thiophene based, reactive colorants for in situ coloration as taught and claimed herein.

A need, therefore, continues to exist for a coloring agent which has excellent water resistance, oil resistance and/or bleeding resistance, and which at the same time may be easily incorporated into the reaction mixture without adverse interaction with components of the reaction mixture. Accordingly, it would be highly desirable to provide a process for preparing colored thermosetting resin products in which the coloring agent has the foregoing advantages. Briefly, the present invention is directed to reactive colorants which combine the very desirable characteristics of high color yields of dyes with the non-migratory properties of pigments. The result is a product which is superior to both dyes and pigments in terms of cost effectiveness and properties of the cured polymer system.

According to the present invention novel reactive colorants are provided of the formula:

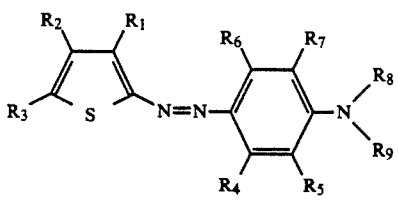

wherein $R_1$, $R_2$ and $R_3$ are selected from halogen, carboxylic acid, alkanoyl, aryloyl, carbocyclic forming polymethylene chains, alkyl, aryl, cyano, thioalkyl, dithioalkyl, thioaryl, dithioaryl, thiocyano, carboxyalkyl, carboxyaryl, amidoalkyl, amidodialkyl, amidoaryl, amidodiaryl, oxyalkyl, oxyaryl, thioamidoalkyl, thioamidodialkyl, or hydrogen when an adjacent group is isobutyryl; $R_4$, $R_5$, $R_6$ and $R_7$ bare selected from hydrogen, alkyl, oxyalkyl, oxyaryl, sulfonamidoalkyl, sulfonamidoaryl, amidoalkyl, amidodialkyl, amidoaryl, amidodiaryl, halogen, thioalkyl and thioaryl; and $R_8$ and $R_9$ are selected from polyalkylene oxide, coppolymers of polyalkylene oxides, and hydroxyalkylenes.

According to a preferred embodiment the $R_1$, $R_2$ and $R_3$ groups in the above formula may be selected from cyano lower alkyl, a carbocyclic forming polymethylene chain, carboxyalkyl, alkanoyl, amidoaryl or hydrogen when an adjacent group is isobutyryl. In an even more preferred embodiment, the $R_4$, $R_5$ and $R_6$ groups in the above formula may be selected from hydrogen, halogen or lower alkyl.

Colorants according to the present invention are generally liquid at ambient conditions of temperature and pressure, though if not, are generally soluble in reactants of processes in which they are employed.

In order to avoid adverse interactions during production of the polyurethane resin, the presence on the thiophene ring of certain substituents such as $NO_2$, $NO$, $NH_2$, $NHR$ (where R is alkyl or aryl), $SH$, $OH$, $CONH_2$, $SO_2NH_2$ as well as hydrogen except as specified above should be avoided.

The substituents provided in the $R_8$ and $R_9$ position for colorants of the present invention may be any suitable substituent having two or more carbon atoms and which will accomplish the objects of the present invention. Typical of such substituents which may be attached to the dyestuff radical are the hydroxyalkylenes, polymeric epoxides, such as the polyalkylene oxides and copolymers thereof. Polymeric substituents are preferred. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. Further, such substituents generally have an average molecular weight in the range of from about 44 to about 2500, preferably from about 88 to about 1400, but should not be so limited.

Examples of particularly preferred compounds within the scope of the present invention are set forth below (in each instance $R_8$ and $R_9$ are selected from a copolymer of ethylene oxide and propylene oxide having a molecular weight of from about 88 to about 1400).

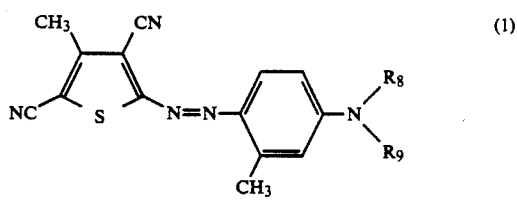

(1)

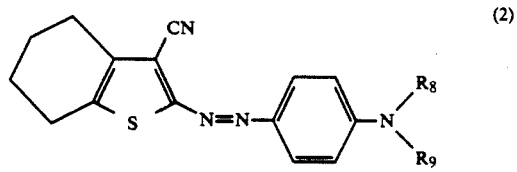

(2)

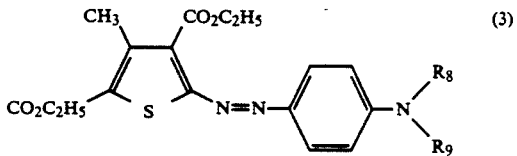

(3)

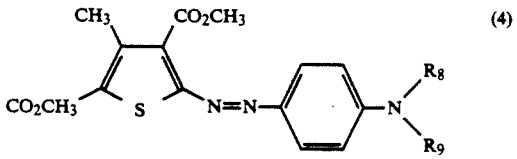

(4)

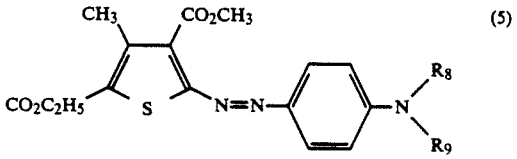

(5)

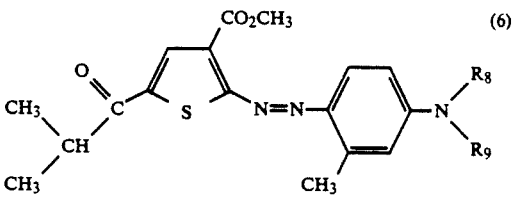

(6)

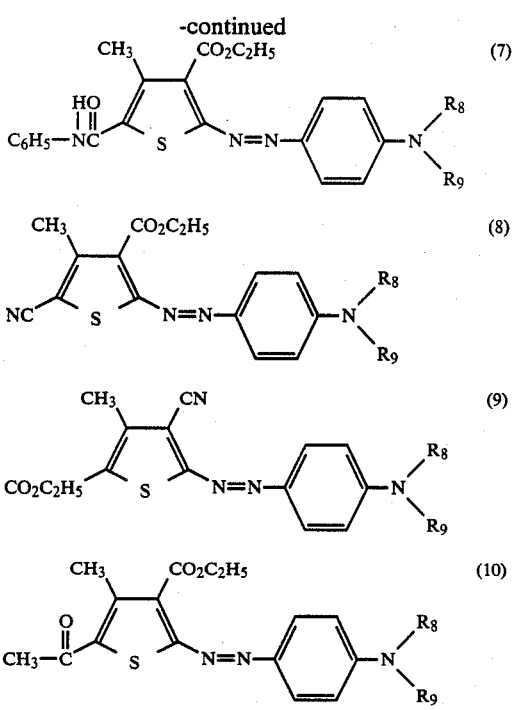

In formulas 1 through 10, R8 and R9 have the values given above. Any suitable procedure may be employed to produce the reactive colorants of the present invention whereby the reactive substituent, or substituents, are coupled to an organic dyestuff radical. For example, the procedure set forth in U.S. Patent 3,157,633, incorporated herein by reference, may be employed.

Further, it may be desirable to use an organic solvent as the reaction medium since the reactive substituent is preferably in solution when coupled to the organic dyestuff radical. Any suitable organic solution, even an aqueous organic solution, may be employed. The particular shade of the colorant will depend primarily upon the particular dyestuff radical selected.

A large variety of colors and shades may be obtained by blending two or more colorants. Blending of the colorants of the present invention can be readily accomplished as the colorants are preferably liquid, though if not, have substantially identical solubility characteristics. Therefore, the reactive colorants are in general soluble in one another, and are also in general completely compatible with each other.

For example, the colorants according to the present invention may be prepared by converting a dyestuff intermediate containing a primary amino group into the corresponding reactive compound, and employing the reactive compound to produce a colored product having a chromophoric group in the molecule. In the case of azo dyestuffs, this may be accomplished by reacting a primary aromatic amine with an appropriate amount of an alkylene oxide or mixtures of alkylene oxides, such as ethylene oxide, propylene oxide, or even butylene oxide, according to procedures well known in the art.

Once the reactive coupler is produced along the lines described above, same can be reacted with the thiophene derivative as set forth in the Examples one through five hereinafter. As can be seen from the Examples, the colorant form includes liquids, oils, and powders, all of which may be successfully employed in a coloration process.

Reactive colorants of the invention may be incorporated into a resin for coloration of same by simply adding the colorant to the reaction mixture or to one of the components of the reaction mixture before or during the polyaddition reaction. For instance, for coloration of polyurethane resin, the colorant may be added to the polyol or even in some instances to the polyisocyanate component of the reaction mixture either before or during polyurethane formation. The subsequent reaction may be carried out in the usual manner, i.e, in the same way as for polyurethane resins which are not colored.

The products of the present invention are advantageous for use in the production of polyurethane foams in which several reactions generally take place. First an isocyanate such as toluene diisocyanate is reacted with a polyol such as polypropylene glycol in the presence of heat and suitable catalyst. If both the isocyanate and the polyol are difunctional, a linear polyurethane results, whereas should either have functionalities greater than two, a cross linked polymer will result. If the hydroxylic compound available to react with the —NCO group is water, the initial reaction product is a carbamic acid which is unstable and breaks down into a primary amine and carbon dioxide. Since excess isocyanate is typically present, the reaction of the isocyanate with the amine generated by decarboxylation of the carbamic acid occurs, and if controlled, the liberated carbon dioxide becomes the blowing agent for production of the foam. Further, the primary amine produced reacts with further isocyanate to yield a substituted urea which affords strength and increased firmness characteristics to the polymer.

In general, amine and tin catalysts are used to delicately balance the reaction of isocyanate with water, the blowing reaction, and the reaction of isocyanate with polymer building substituents. If the carbon dioxide is released too early, the polymer has no strength and the foam collapses. If polymer formation advances to rapidly a closed cell foam results which will collapse on cooling. If the colorant or another component reacts to upset the catalyst balance poorly formed foam will result.

Additionally, the substituted urea may react with excess isocyanate, and the urethane itself reacts with further isocyanate to cross-link the polymer by both biuret and allophonate formation. Foams colored by the present colorants may be soft, semi-rigid, or rigid foams, including the so-called polyurethane integral skin and microcellular foams.

Coloring agents according to the present invention are reactive coloring agents, and may be added to the reaction mixture, or to one of the components thereof. When in liquid form, colorants of the present invention may be added as one or more of the components of the reaction mixture. Conversely when in oil or powder forms, the colorants are first added to one of the reactive components and are carried thereby, or conversely are dissolved in a solvent carrier and added as a separate component. Obviously liquids have significant processing advantages over solids, and may, if desired, be added directly to the reaction mixture so that no extraneous nonreactive solvent or dispersing agent is present.

Polyurethane products which may be colored with reactive colorants of the present invention are useful for producing shaped products by injection molding, extrusion or calendering and may be obtained by adding the coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The coloring agent may also be admixed with the so-called chain extending diols, e.g., ethylene glycol, diethylene glycol and butane diol. In general, it is desirable not to use more than about 20 percent by weight of coloring agent based on the weight of polyol. In most cases very strong colorations are produced with a small proportion of the coloring agent. For example, from about 0.1 to about 5 percent, preferably 0.5 to 2 percent by weight coloring agent may be utilized based on the weight of polyol.

The preferred colorants of the invention may be soluble, for instance, in most polyols which would be used in polyurethanes, and in themselves. This property may be particularly valuable for three reasons. First, this solubility may permit rapid mixing and homogenoeous distribution throughout the resin, thus eliminating shading differences and streaks when properly mixed. Second, the colorant may have no tendency to settle as would be the case with pigment dispersions. Third, it is possible to prepare a blend of two or more colors which provides a wide range of color availability.

Present reactive coloring agents may also be of considerable value in reaction injection molding (RIM) applications. The RIM process is a method of producing molded urethanes and other polymers wherein the two reactive streams are mixed while being poured into a mold. Upon reaction, the polymer is "blown" by chemicals to produce a foamed structure. This process may be hindered by the presence of solid particles, such as pigments. The present invention may not cause this hindrance because there are no particles in the system and the colorant becomes part of the polymer through reaction with one of the components.

The following examples illustrate the invention, and parts and percentages, unless otherwise noted are by weight:

EXAMPLE 1

Ninety two and one half grams of phosphoric acid (85% strength) was added along with 12.5 grams of sulfuric acid (98% strength) and 2 drops of 2-ethylhexanol defoamer to a 500 ml closed flask. The mixture was then cooled and 8.2 grams of 2-amino-3,5-dicyano-4-methyl thiophene was added followed by further cooling to below 0° C. Eighteen grams of nitrosyl sulfuric acid (40%) was slowly added while maintaining temperature below 0° C. After three hours, the mixture was tested for nitrite. A positive nitrite test was obtained and one gram of sulfamic acid was added and a vacuum was pulled. After one hour, a negative nitrite test was obtained. Ten and eight tenths grams of coupler (M-toluidine—2EO), 300 grams of ice and water, and 2 grams of urea were added to a 4 liter beaker and cooled to below 0° C. The diazo solution from the flask was added dropwise to the beaker over 40 minutes, maintaining temperature below 0° C. The resulting mixture was stirred for several hours and allowed to stand overnight, after which 122 grams of sodium hydroxide (50%) were added to neutralize excess acid to a pH of about 7. The resulting product was filtered, washed several times with hot water. It was then dissolved in isopropyl alcohol, and precipitated again by adding water, filtered and dried to give a violet powder that melted at 208° C.

EXAMPLE 2

The procedure of Example 1 was followed with the exception of amounts of reactants and the particular thiophene and coupler employed, all of which are specified 49 ml—acetic acid
19.5 ml—propionic acid
2.5 grams—H2SO4
1 drop—2-ethylhexanol defoamer
5.7 grams—2-amino-3-carbomethoxy-5-isobutyryl thiophene
9 grams—nitrosyl sufuric acid
0.5 grams—Sulfamic acid
4.5 grams—2-methoxy-5-acetamido-aniline 2EO
100 grams—ice
2 grams—urea
50 grams—ammonium acetate
300 grams—water and ice The precipitated product (after neutralizing with sodium hydroxide) was collected and water washed several times. The product was oven dried at 75° C. and give a bluish violet solid.

EXAMPLE 3

The procedure of Example 1 was followed except for amounts of reactants and the particular thiophene and coupler. Such are set forth below as follows:

200 grams—H3PO4
25 grams—H2SO4
2 drops—2-ethylhexanol defoamer
16.3 grams—2-amino-3,5-dicyano-4-methyl thiophene
35 grams—nitrosyl sulfuric acid
3 grams—sulfamic acid
121 grams—m-toluidine-2EO/15PO/2EO
60.5 grams—ice
4 grams—urea The excess acid was neutralized with 272 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield a violet oil.

EXAMPLE 4

The procedure of Example 3 was followed with the exception of amount of reactants and the particular thiophene and coupler employed, all of which are specified 183 Grams—H3PO4
25 grams—H2SO4
2 drops—2-ethylhexanol defoamer
25.7 grams—2-amino 3,5-dicarboethoxy -4-methyl thiophene
35 grams—nitrosyl sulfuric
1 gram—sulfamic acid
121 grams—m-toluidine 2EO/15PO/2EO
247 grams—ice
2 grams—urea
A red oil resulted.

EXAMPLE 5

The procedure of Example 3 was followed with the exception of amount of reactants and the particular thiophene and coupler employed, all of which are specified below:
100 grams—$H_3PO_4$
15 grams—$H_2SO_4$
2 drops—2-ethylhexanol defoamer
8.9 grams—2-amino-3-cyano-4,5tetramethylene thiophene
17.5 grams—nitrosyl sulfuric
1 gram—sulfamic acid
60.5 grams—m-toluidine 2EO/15PO/2EO
120 grams—ice
A red oil resulted.

EXAMPLE 6

A masterbatch for the production of polyurethane foam was prepared by adding 3000 grams of Niax-16-56 (a 3000 molecular weight triol available from Union Carbide) 125.1 grams of water, and 7.8 grams of Dabco 33LV (amine catalyst available from Air Products) to a one gallon plastic jug, mixed well and stored at 65oF for further use.

EXAMPLE 7

A polyether polyurethane foam (control) was produced as follows. One hundred and four grams of the masterbatch of Example 6 were added to a 400 milliliter disposable beaker, and one gram of a reactive colorant as taught herein was added thereto along with one milliliter of Liquid Silicone L-520 (available from Union Carbide). The mixture was stirred in a blender for 25–30 seconds, 0.20 milliliters of T-9 (stannous octanoate catalyst) added thereto from a syringe, and stirred for an additional 5-8 seconds. Thereafter, 46 milliliters of toluene diisocyanate were added to the beaker and the mixture stirred for six seconds. A blended, homogenous mixture resulted and was poured into an 83 ounce paper bucket. The mixture foamed, and after the foam stopped rising, was cured in an oven at 130° C. for 15 minutes.

EXAMPLE 8

Polyurethane foam samples containing a flame retardant were produced as described in Example 7 with the exception that 10 grams of Thermolin T-101 flame retardant (available from Olin) were added to the beaker with the other components, and the foam sample was cured at 130° C. for 30 minutes. The foam of this Example possessed flame retardant properties.

As discussed above, while a number of colorants have heretofore been utilized for in situ coloration of polymeric materials, polyurethane foams present somewhat special problems. Specifically, the colorant must be stable to tin catalysts utilized in the production of the urethane, and also stable to flame retardants that are normally included in the polymer.

Instability as to the stannous tin catalysts, results in reduction of the dyestuff leading to significant, if not total, loss of color. Additionally, the foam producing process is also adversely affected. The foam does not rise at a proper rate and does not cure at a fast enough rate. A tacky polyurethane with poor polymer properties results. It is thus important that colorants for polyurethanes be stable to the tin catalysts. This is a desirable and qualifying characteristic of colorants of the present invention.

Also with instability to flame retardants, a color change or color shift will appear which renders an unstable colorant useless. Typically colorants unstable to flame retardants change color as follows: red to violet and orange to red. While a number of commercially available dyestuffs are not stable in the presence of the flame retardants, colorants of the present invention do possess such stability.

In order to demonstrate stability to both the tin catalysts and flame retardants, Examples 7 and 8 were reproduced with a number of different specific colorants, both according to the present invention and otherwise. Example 7 (without flame retardant) serves as a control for evaluation of stability to flame retardants. The tin stability test is set forth in Example 9.

EXAMPLE 9

Tests were also conducted as to tin stability according to the following procedure. First the color value for the colorants tested was determined by placing about 0.10 to 0.15 grams of colorant into a 100 milliliter volumetric flask and adding approximately 40 to 50 milliliters of methanol. The flask was swirled until the colorant dissolved in the methanol, after which excess methanol was added to the 100 milliliter mark on the flask. The flask was stoppered and the contents were mixed and shaken. Exactly 2.0 milliliters of the solution of the colorant in methanol was then added to a separate like flask and the flask was filled with methanol to the 100 milliliter mark, stoppered and shaken.

A Beckman DU-7 spectrometer was zeroed with methanol, filled with the test solution, and the solution was scanned from 300 to 750 mm. The maximum absorbance was recorded. Color value is obtained by multiplying the sample weight by 0.2 and dividing the product obtained into the maximum absorbance value.

In the case of liquid phase colorant, the colorant to be tested was then added to a 50 milliliter volumetric flask. In order to correct for varying color strengths the amount of colorant added was determined by the following formula:

5/(Color value)=number of grams added.

Then 35 milliliters of 2-ethoxyethylether or 2-methoxylethylether were added to dissolve the colorant. Further solvent was then added to bring the total contents to the 50 milliliter mark. The flask was stoppered and shaken. Exactly 2.0 milliliters of this solution were transferred to a further 50 milliliter flask and diluted to the 50 milliliter mark with one of the solvents.

In the case of solid colorant to be tested colorant to be added to a 100 ml volumetric flask. In order to correct for varying color strengths the amount of colorant added was determined as follows:

5/2 (color value)=number of grams added.

Then 35 ml of 2-ethoxyethyl-either or 2-methoxyethylether solvent was added to dissolve the colorant. An additional amount of solvent was added to bring the level in the volumetric flask to the 100 ml mark; a stopper was inserted, and the contents of the flask were mixed well by shaking. Exactly 4.0 ml of this solution were then transferred to another 100 ml volumetric flask and diluted to the 100 ml mark with solvent.

A solution of T-9 (stannous octanoate) was prepared with minimum air exposure by dissolving 0.70 gram of stannous octanoate in seven milliliters of solvent in a vial which was kept sealed between runs. The Beckman spectrometer was set up for repetitive scanning. Two milliliters of colorant solution (either solid or liquid as described above) were placed into a vial with 2.0 milliliters of the tin catalyst solution and mixed well. The mixture was then transferred to the cell of the spectrometer which was capped and quickly placed into the spectrometer (not more than 20 to 30 seconds elapsed time). Five repetetive scans were then made for each colorant sample at three intervals. The percentage loss after fifteen minutes (5 scans) was measured from initial absorbance and last absorbance.

A number of commercially useful benzothiazole colorants were investigated as to stability to flame retardants. In the control test, i.e., no flame retardant present, following the procedures of Example 7, all of the compounds tested passed, indicating no color change. When, however, the same compounds were included in production of foam according to Example 8 where the flame retardant was included, all of the compounds failed.

EXAMPLE 10

In like fashion to the benzothiazole investigations, a number of colorants according to the present invention were prepared according to the general procedures set forth in Examples 1 through 5. Thereafter, the colorants were utilized in the coloration of polyurethane foams as described in Examples 7 and 8 to determine stability of same to flame retardants. All of the thiophene compounds passed both tests, indicating stability to flame retardants. Compounds tested are listed in Table I below.

The following abbreviations are utilized in the following tables: Et=ethyl; EO=ethylene oxide; PO=propylene oxide; ME=methyl; Ac=acetate. Also where numbers are separated by diagonals, eg. 2/15/5, such refers to moles EO/moles PO/moles EO.

TABLE I
Effect of Flame Retardants on Thiophene Reactive Colorants

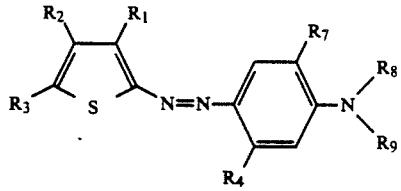

| Ex. No. | $R_1$ | $R_2$ | $R_3$ | $R_4$ | $R_7$ | $R_8$, $R_9$ | Color |
|---|---|---|---|---|---|---|---|
| 11 | $CO_2Et$ | Me | CN | H | H | 2EO/15PO/5EO | Red |
| 12 | " | " | " | Me | " | " | Red |
| 13 | " | " | " | OMe | OMe | 2/10/5 | Violet |
| 14 | " | " | COMe | H | H | 2/15/5 | Red |
| 15 | CN | " | $CO_2Me$ | " | " | " | Red |
| 16 | $CO_2Et$ | " | $CONHC_6H_5$ | " | " | " | Red |
| 17 | " | " | " | Me | " | 2/15/5 | Red |
| 18 | " | " | " | H | " | " | Red |
| 19 | " | " | $CO_2Et$ | " | " | " | Red |
| 20 | " | " | " | Cl | " | 2/10/6 | Red |
| 21 | " | " | " | Me | " | 2/15/2 | Red |
| 22 | $CO_2Me$ | " | $CO_2Me$ | H | " | 2/15/5 | Red |
| 23 | " | " | " | " | " | 2/10/6 | Red |
| 24 | $CO_2Et$ | " | $CO_2Et$ | " | " | 2/15/5 | Red |
| 25 | " | " | " | Cl | " | " | Red |
| 26 | $CO_2Me$ | " | $CO_2Me$ | " | " | " | Red |
| 27 | " | " | $CO_2Et$ | H | " | 2/10/6 | Red |
| 28 | CN | " | CN | OMe | OMe | 2/10/5 | Violet |
| 29 | " | " | " | Me | H | 2/15/5 | Violet |
| 30 | " | " | " | " | " | 2/15/2 | Violet |
| 31 | " | " | " | " | " | 2/10/8 | Violet |
| 32 | " | " | " | " | " | 2/7/6 | Violet |
| 33 | " | " | " | " | " | 2/10/6 | Violet |
| 34 | " | " | " | H | " | 2/15/5 | Violet |
| 35 | CN | " | CN | Me | H | 2EO | Violet |
| 36 | " | " | " | OMe | OMe | " | Blue |
| 37 | " | " | " | NHAc | OMe | " | Blue |
| 38 | " | —$(CH_2)_4$— | H | H | " | Red |
| 39 | $CO_2Et$ | Me | $CO_2Et$ | " | " | " | Red |
| 40 | $CO_2Me$ | H | $COCHMe_2$ | NHAc | OMe | " | Violet |
| 41 | $CO_2Et$ | —$(CH_2)_4$— | Me | H | 2/15/2 | Red |
| 42 | " | —$(CH_2)_4$— | H | " | 2/15/5 | Red |
| 43 | " | " | " | Me | " | 2/15/8 | Red |
| 44 | " | " | " | H | " | 2/10/6 | Red |
| 45 | " | " | " | Me | " | 2/15/8 | Red |
| 46 | $CO_2Et$ | " | " | H | H | 2/15/5 | Red |
| 47 | $CO_2Me$ | H | $COCHMe_2$ | Me | H | 2/15/2 | Violet |
| 48 | $CONHC_2H_4OH$ | " | " | " | " | " | Blue |
| 49 | $CO_2Me$ | " | " | OMe | " | 2/10/5 | Violet |
| 50 | $CONHC_2H_4OH$ | " | " | " | OMe | " | Blue |
| 51 | " | " | " | NHAc | " | " | Blue |

Benzothiazoles of the type tested as to flame retardant stability were also tested as to stability as to the stannous octanoate catalyst according to the test procedures set forth in Example 9. Compounds and results are set forth in Table II.

TABLE II

Effect of Stannous Octonate Catalyst on Colorants For Polymeric Resins

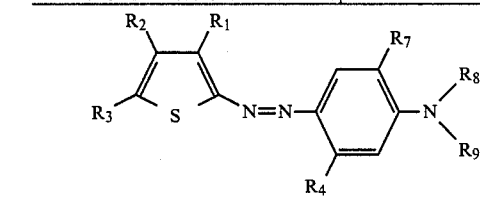

| Ex. No. | $R_1$ | $R_2$ | $R_3$ | $R_4$ | $R_8, R_9$ | % Loss | Color |
|---|---|---|---|---|---|---|---|
| 52 | H | H | OMe | Me | 10EO | 56.5 | Red |
| 53 | Cl | " | H | H | 2/15/5 | 91.5 | Red |
| 54 | OMe | " | " | OMe | 12EO | 66.7 | Red |
| 55 | Me | " | Cl | H | 2/10/5 | 85.9 | Red |
| 56 | Cl | " | H | Cl | 2/15/5 | 97.8 | Red |
| 57 | " | " | Cl | H | " | 87.9 | Red |
| 58 | H | Cl | " | " | " | 100.0 | Red |

Like tests were performed as to colorants according to the present invention, results of which may be compared to the benzothiazole results of Examples 52 through 58. Compounds tested and results are set forth in Table III.

TABLE III

Effect of Stannous Octoate on Thiophene Based Colorants

| Ex. No. | $R_1$ | $R_2$ | $R_3$ | $R_4$ | $R_7$ | $R_8, R_9$ | % Loss | Color |
|---|---|---|---|---|---|---|---|---|
| 59 | CO$_2$Et | Me | CO$_2$Et | Me | H | 2/15/2 | 5.3 | Red |
| 60 | CN | " | CN | H | " | 2/15/5 | 0.0 | Violet |
| 61 | CO$_2$Et | " | " | " | " | " | 3.3 | Red |
| 62 | CN | " | CO$_2$Et | " | " | 2/15/8 | 2.9 | Red |
| 63 | CO$_2$Et | " | " | Cl | " | 2/10/6 | 2.7 | Red |
| 64 | CN | " | CN | OMe | OMe | " | 6.2 | Blue |
| 65 | CO$_2$Et | " | " | CN | H | 2/15/2 | 4.0 | Red |
| 66 | CN | " | CO$_2$Et | H | " | 2/15/5 | 5.9 | Violet |
| 67 | CO$_2$Et | " | COMe | " | " | " | 4.8 | Red |
| 68 | " | " | CONHC$_6$H$_5$ | Me | " | 2/15/2 | 3.0 | Red |
| 69 | CN | " | CN | OMe | " | 12EO | 7.0 | Violet |
| 70 | CN | —(CH$_2$)$_4$— | | H | H | " | 3.2 | Red |
| 71 | " | " | | Me | " | 2/15/8 | 2.3 | Red |
| 72 | " | " | | H | " | 2/15/5 | 0.9 | Red |
| 73 | CN | Me | CN | Me | H | 2EO | 3.9 | Violet |
| 74 | " | " | " | OMe | OMe | " | 4.2 | Blue |
| 75 | " | " | " | NHAc | " | " | 4.4 | Blue |
| 76 | " | —(CH$_2$)$_4$— | | H | H | " | 2.1 | Red |
| 77 | CO$_2$Et | Me | CO$_2$Et | " | " | " | 5.6 | Red |
| 78 | " | H | COCHMe$_2$ | NHAc | OMe | " | 4.8 | Blue |

As can be seen from a comparison of the benzothiazoles of Examples 52 to 58 and the thiophenes of Examples 59 to 78, only the thiophenes are stable to the effects of the tin catalyst. Moreover, as defined herein, all of the thiophenes exhibit similar stability.

Having described the present invention in detail it is obvious that one skilled in the art will be able to make variations and modifications thereto without departing from the scope of the present invention. Accordingly, the scope of the present invention should be determined only by the claims appended hereto.

That which is claimed is:

1. A coloring agent, having the formula:

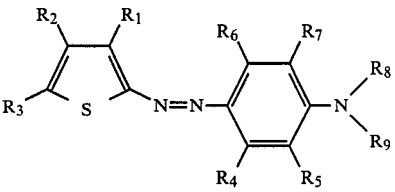

wherein $R_1$, $R_2$ and $R_3$ are selected from halogen, carboxylic acid, alkanoyl, aryloyl, carbocyclic forming polymethylene chains, alkyl, aryl, cyano, thioalkyl, dithioalkyl, thioaryl, dithioaryl, thiocyano, carboxyalkyl, carboxyaryl, amidoalkyl, amidodialkyl, amidoaryl, amidodiaryl, oxyalkyl, thioamidoalkyl, thioamidodialkyl, or hydrogen when an adjacent group is isobutyryl; $R_4$, $R_5$, $R_6$ and $R_7$ are selected from hydrogen, alkyl, oxyalkyl, oxyaryl, sulfonamidoalkyl, sulfonamidoaryl, amidoalkyl, amidodialkyl, amidoaryl, amidodiaryl, halogen, thioalkyl and thioaryl; and $R_8$ and $R_9$ are polyalkylene oxides having an average molecular weight of from about 44 to about 2500 selected from polyethylene oxide, polypropylene oxide, polybutylene oxide and copolymers of polyethylene oxide, polypropylene oxide and polybutylene oxide.

2. The coloring agent of claim 1, wherein $R_1$, $R_2$, and $R_3$ are selected from cyano, lower alkyl, a carbocyclic forming polymethylene chain, carboxyalkyl, alkanoyl, amidoaryl or hydrogen when an adjacent group is isobutyryl.

3. The coloring agent of claim 2 wherein $R_4$, $R_5$, $R_6$ and $R_7$ are selected from hydrogen, halogen or lower alkyl.

4. A coloring agent of the formula:
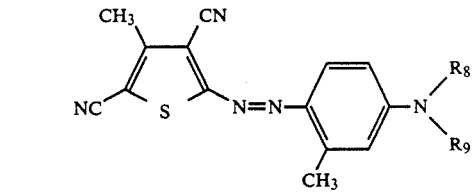
wherein $R_8$ and $R_9$ are selected from polyalkylene oxide and copolymers of polyalkylene oxides having an average molecular weight of from about 88 to about 1400.
* * * * *